(12) United States Patent
Tibbott et al.

(10) Patent No.: US 8,714,918 B2
(45) Date of Patent: May 6, 2014

(54) TURBINE STAGE SHROUD SEGMENT

(75) Inventors: Ian Tibbott, Lichfield (GB); Peter Ireland, Derby (GB); Anthony J Rawlinson, Derby (GB); Lynne H Turner, Bristol (GB)

(73) Assignee: Rolls-Royce PLC, London (GB)

( * ) Notice: Subject to any disclaimer, the term of this patent is extended or adjusted under 35 U.S.C. 154(b) by 531 days.

(21) Appl. No.: 13/177,151

(22) Filed: Jul. 6, 2011

(65) Prior Publication Data
US 2012/0027576 A1 Feb. 2, 2012

(30) Foreign Application Priority Data
Jul. 30, 2010 (GB) .................................. 1012783.5

(51) Int. Cl.
F01D 11/10 (2006.01)
(52) U.S. Cl.
USPC ...................................... 415/173.1
(58) Field of Classification Search
CPC ......... F01D 11/08; F01D 11/10; F01D 11/12; F01D 25/12; F05D 2240/11; F05D 2240/81; Y02T 50/675
USPC ................................ 415/173.1, 173.4, 174.4
See application file for complete search history.

(56) References Cited

U.S. PATENT DOCUMENTS

| | | | |
|---|---|---|---|
| 2,685,429 A | 8/1954 | Auyer | |
| 4,311,431 A | 1/1982 | Barbeau | |
| 4,732,531 A * | 3/1988 | Minoda et al. | 415/115 |
| 5,169,287 A | 12/1992 | Proctor et al. | |
| 5,649,806 A | 7/1997 | Scricca et al. | |
| 6,139,257 A * | 10/2000 | Proctor et al. | 415/115 |
| 6,196,792 B1 | 3/2001 | Lee et al. | |
| 6,354,795 B1 | 3/2002 | White et al. | |
| 7,296,967 B2 | 11/2007 | Shapiro | |
| 7,387,488 B2 | 6/2008 | Nichols et al. | |
| 2007/0059178 A1* | 3/2007 | Shapiro | 416/181 |

FOREIGN PATENT DOCUMENTS

| | | |
|---|---|---|
| GB | 2 104 965 A | 3/1983 |
| WO | WO 94/12775 A1 | 6/1994 |

OTHER PUBLICATIONS

British Search Report issued in British Application No. GB1012783.5 dated Nov. 11, 2010.

* cited by examiner

*Primary Examiner* — Edward Look
*Assistant Examiner* — Juan G Flores
(74) *Attorney, Agent, or Firm* — Oliff PLC

(57) ABSTRACT

A shroud segment for a turbine stage of a gas turbine engine forms an endwall for the working gas annulus of the stage. The segment also provides a close clearance to the tips of a row of turbine blades which sweep across the segment. In use a leakage flow of the working gas passes through the clearance gap between the blade tips and the segment. The segment has a plurality of cooling holes and respective air feed passages for the cooling holes. The cooling holes are distributed over that part of the gas-washed surface of the segment which is swept by the blade tips. The cooling holes deliver, in use, cooling air which spreads over the gas-washed surface. The feed passages are configured such that the delivered air opposes the leakage flow of the working gas.

8 Claims, 9 Drawing Sheets

TURBINE STAGE SHROUD SEGMENT

CROSS-REFERENCE TO RELATED APPLICATIONS

This application is based upon and claims the benefit of priority from British Patent Application Number 1012783.5 filed 30 Jul. 2010, the entire contents of which are incorporated by reference.

BACKGROUND OF THE INVENTION

1. Field of the Invention

The present invention relates to a shroud segment for a turbine stage of a gas turbine engine With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate-pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore the need to cool the static and rotary parts of the engine structure decreases as the gas moves from the high-pressure stage(s), through the intermediate-pressure and low-pressure stages, and towards the exit nozzle.

FIG. 2 shows an isometric view of a typical single stage cooled turbine. Cooling air flows are indicated by arrows.

Internal convection and external films are the prime methods of cooling the gas path components—airfoils, platforms, shrouds and shroud segments etc. High-pressure turbine nozzle guide vanes 31 (NGVs) consume the greatest amount of cooling air on high temperature engines. High-pressure blades 32 typically use about half of the NGV flow. The intermediate-pressure and low-pressure stages downstream of the HP turbine use progressively less cooling air.

The high-pressure turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

Ever increasing gas temperature levels combined with a drive towards flatter combustion radial profiles, in the interests of reduced combustor emissions, have resulted in an increase in local gas temperature experienced by the working gas annulus endwalls, which include NGV platforms 33, blade platforms 34 and shroud segments 35 (also known as shroud liners). However, the flow of air that is used to cool these endwalls can be highly detrimental to the turbine efficiency. This is due to the high mixing losses attributed to these cooling flows when they are returned to the mainstream working gas path flow.

One option is to cool the platforms and shroud segments by an impingement flow of cooling air on the back surface of the gas washed wall of the component. For example, a perforated plate spaced from the gas washed wall and supported by pedestals can form impinging jets, and the spent coolant can then flow back into the working gas path at the rear edges of the component. Unfortunately, limited numbers of impingement jets can produce non uniform heat transfer distributions, and the cross flow from spent coolant can reduce the effectiveness of the impingement jets at the more downstream locations of the component. In addition, the need to keep the coolant pressure at a level above that in the working gas path reduces the allowable pressure drop across the impingement jets, and hence the associated heat transfer levels.

Thus, in the case of shroud segments, there has been a move towards the use of abradable coatings that provide a thermal insulating barrier on the gas washed surface of the segment. The corresponding blade tips may have abrasive coatings attached in order to facilitate the cutting of a track into the abradable coating. These coatings have proved effective at reducing the heat flux into the segments. However, their low thermal conductivities introduce a high thermal gradient across the thickness of the coating. Consequently the gas washed surface becomes very hot, and if not protected can increase to a temperature exceeding the sintering temperature limit of the coating material. Similarly, the bond coat that typically attaches the abradable coating to the segment also needs to be kept below a certain temperature to prevent the interface between the coating and the bond coat alloy from oxidizing and prematurely shedding the coating.

2. Description of the Related Art

In an attempt to reduce the temperature of the gas washed surface of these coatings, a film of cooled air can be provided between the hot working gas and the coating. This can be achieved by the introduction of effusion cooling onto the surface of the segment. FIG. 3 shows an isometric view of a typical shroud segment with an abradable coating and effusion cooling. The segment has a cast alloy body 40, mounting legs 41 for mounting to the turbine support casing, upstream 42 and downstream 43 edges, a feather or strip seal leakage control groove 44, an abradable surface coating 45, and a plurality of effusion cooling holes 46 which deliver streams of cooling air onto the gas washed surface of the surface coating. These streams of cooled air form a protective film on the gas washed surface. However, the film mixes with the hot gas that is adjacent to the surface and progressively heats up as it flows over the surface. This degradation of the film is normally expressed as a "film effectiveness", which typically deteriorates with distance from the holes.

To try to achieve a high level of film effectiveness, it is conventional to introduce the cooling air onto the surface with a low momentum in order to match the momentum of the gas in contact with the wall. If the blowing rate of the film is too high then the film will blow off the surface and mixing between the gas and coolant will be encouraged. The holes can be formed as fan shaped openings in order to diffuse the flow as it exits the hole. The angle of the holes' feed passages is also an important parameter. In general, a shallower angle of the line of the feed passage relative to the gas washed surface (i.e. a smaller radial angle relative to the engine axis) helps to prevent the film from becoming detached from the surface.

Although the gas washed surface of a shroud segment has a close clearance to the tips of the turbine blades, a leakage flow of working gas nonetheless passes through the gap between the blade tips and the segment. This leakage flow is detrimental to engine efficiency, and also sets up a pressure gradient that is a destructive influence on the cooling film. The present invention is at least partly based on the realisation that shroud segment cooling air can be used to reduce the amount of such leakage flow.

OBJECTS AND SUMMARY OF THE INVENTION

Thus a first aspect of the present invention provides a shroud segment for a turbine stage of a gas turbine engine, the segment forming an endwall for the working gas annulus of the stage, and providing a close clearance to the tips of a row of turbine blades which sweep across the segment, in use a leakage flow of the working gas passing through the clearance gap between the blade tips and the segment, wherein:

the segment has a plurality of cooling holes and respective air feed passages for the cooling holes, the cooling holes being distributed over that part of the gas-washed surface of the segment which is swept by the blade tips, the cooling holes delivering, in use, cooling air which spreads over the gas-washed surface, and the feed passages being configured such that the delivered air opposes the leakage flow of the working gas; and the feed passages are configured such that the delivered-air swirl directions of those cooling holes swept by the trailing edges of the blade tips are rotated towards the axial direction of the engine relative to the delivered-air swirl directions of those cooling holes swept by the leading edges of the blade tips.

Although the opposition to the leakage flow may have a detrimental effect on the film cooling effectiveness of the segment, this disadvantage can be more than offset by efficiency gains associated with a reduced leakage flow. Indeed, as the leakage flow can itself be a cause of film disruption, a reduced film effectiveness may in any event be acceptable. Further, it may be possible to compensate for any loss in film effectiveness by increasing convective heat transfer to the cooling air before it exhausts from the holes.

Configuring the feed passages such that the delivered-air swirl directions of those cooling holes swept by the trailing edges of the blade tips are rotated towards the axial direction of the engine relative to the delivered-air swirl directions of those cooling holes swept by the leading edges of the blade tips can help to better match the delivered-air swirl directions to the local leakage flow directions. This is because, typically, the local direction of the leakage flow at the trailing edges of the blade tips is rotated towards the axial direction of the engine relative to the local direction of the leakage flow at the leading edges of the blade tips.

The shroud segment may have any one or, to the extent that they are compatible, any combination of the following optional features.

The line of each feed passage can be defined, relative to the engine axis, by a swirl angle and a radial angle. The swirl angle of the line of the feed passage usually determines (e.g. is usually the same as) the swirl angle of the cooling air delivered out of the corresponding cooling hole and hence the swirl direction of that delivered air. Configuring a feed passage such that the delivered air opposes the leakage flow of the working gas thus typically involves, for a given position of the cooling hole, setting the swirl angle of the line of the feed passage to provide a desired delivered-air swirl direction.

Preferably, each feed passage is configured such that the delivered air has a swirl direction which opposes the local direction of the leakage flow at the respective cooling hole to within at least 30°, and more preferably to within at least 20° or 10°.

The feed passages may be configured such that the delivered-air swirl directions of the respective cooling holes encountered when moving in an axial direction of the engine from the cooling holes swept by the leading edges of the blade tips to the cooling holes swept by the trailing edges of the blade tips rotate through an angle in the range of from 10° to 70°, and preferably through an angle in the range of from 25° to 55°, for example 30°.

The portion of the gas-washed surface which is swept by the blade tips may have at least four, and preferably at least six or eight, axially-spaced and circumferentially-extending rows of cooling holes, each row having a respective delivered-air swirl angle (i.e. the delivered-air swirl directions of all the holes of a given row are rotationally symmetric under rotation about the engine axis). Having more rows of cooling holes allows the delivered air from each hole to be focused on opposing the leakage flow over a smaller axial distance from each hole. In other words, as variation in direction and strength of the leakage flow is generally narrower over smaller axial distances, each hole can be better "tuned" to the local leakage flow condition. In this way, increased numbers of rows of cooling holes can provide a more effective opposition to the overall leakage flow. The cooling holes and respective air feed passages of each row can be configured to produce a fluctuation in the delivered air flow rate encountered when moving in a circumferential direction along the row.

Optionally, the holes of at least some neighbouring circumferentially-extending rows may be circumferentially offset. This may assist in allowing the desired angle and spacing of holes, for example by ensuring that the holes do not overlap with each other. Such an arrangement may also assist in providing improved tip sealing over the entire circumference of the shroud.

Typically, the delivered air from the cooling holes can reduce the working gas leakage flow by at least 20%, and preferably by at least 30% or 50%, relative to the working gas leakage flow that would exist in the absence of film cooling of the segment.

A further aspect of the present invention provides a gas turbine engine having a turbine stage with shroud segments according to the first aspect.

According to an aspect of the invention, there is provided a method of producing a shroud segment for a turbine stage of a gas turbine engine, the segment forming an endwall for the working gas annulus of the stage, and providing a close clearance to the tips of a row of turbine blades which sweep across the segment, in use a leakage flow of the working gas passing through the clearance gap between the blade tips and the segment. The method comprises: performing a computational fluid dynamics calculation to predict the leakage flow; and producing a shroud segment as proposed herein, the feed passages being configured such that the delivered air opposes the leakage flow of the working gas, and the delivered-air swirl directions of those cooling holes swept by the trailing edges of the blade tips are rotated towards the axial direction of the engine relative to the delivered-air swirl directions of those cooling holes swept by the leading edges of the blade tips.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
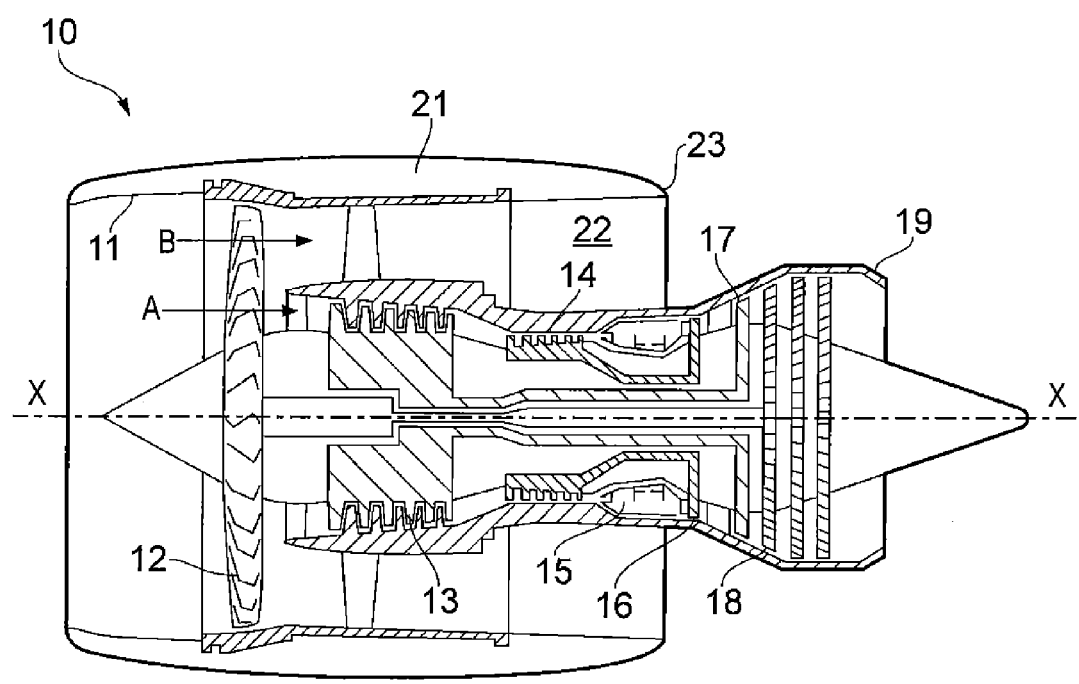
FIG. 1 shows a schematic longitudinal cross-section through a ducted fan gas turbine engine.
Figure 2:
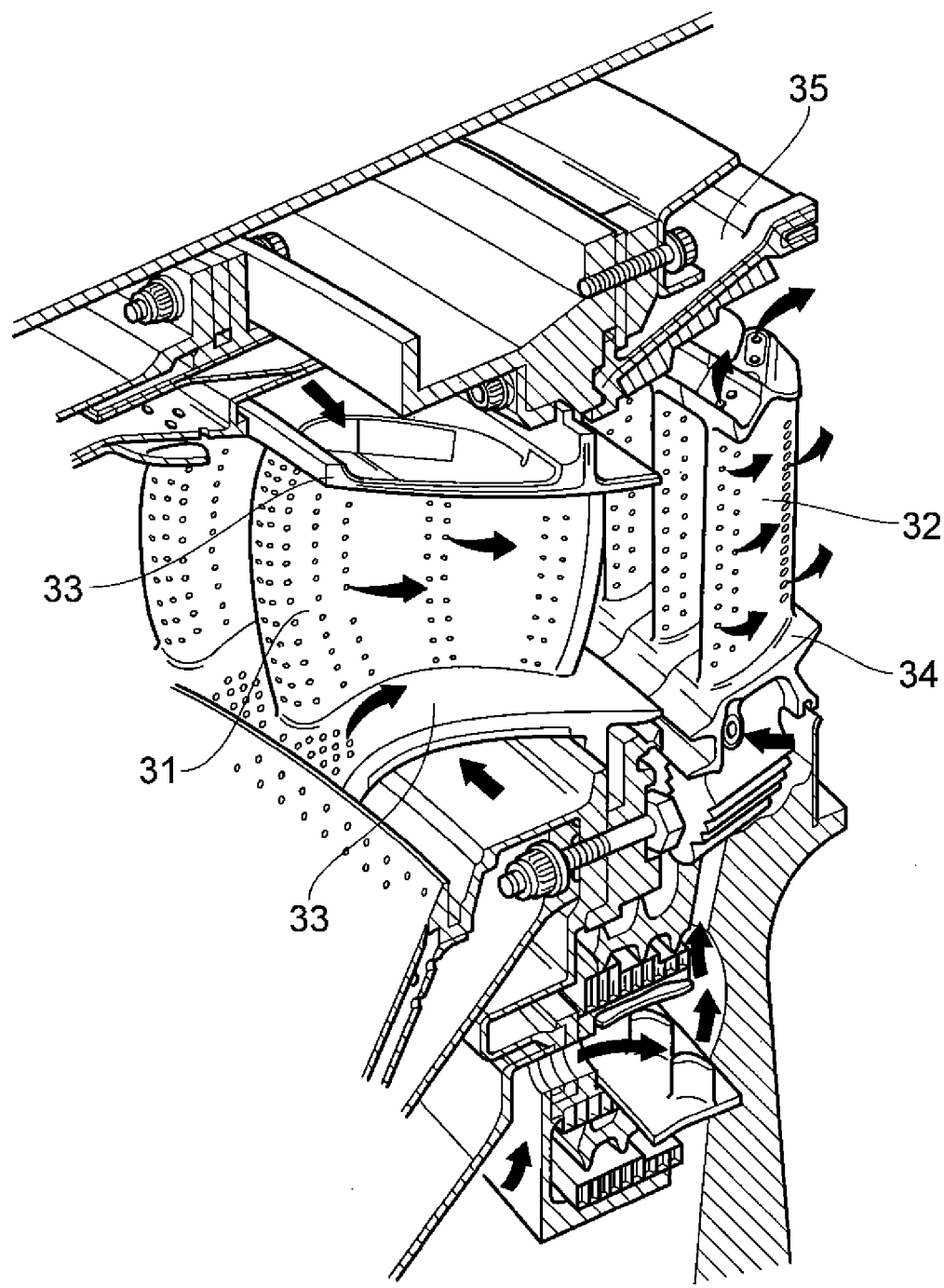
FIG. 2 shows an isometric view of a typical single stage cooled turbine.
Figure 3:
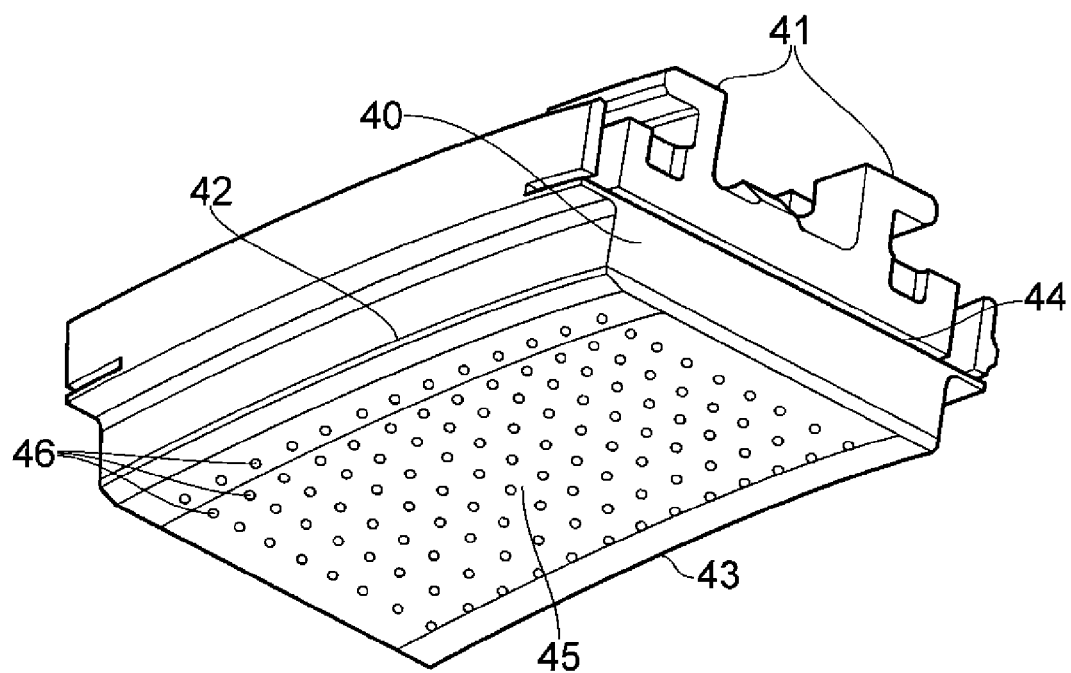
FIG. 3 shows an isometric view of a typical shroud segment with an abradable coating and effusion cooling.
Figure 4:
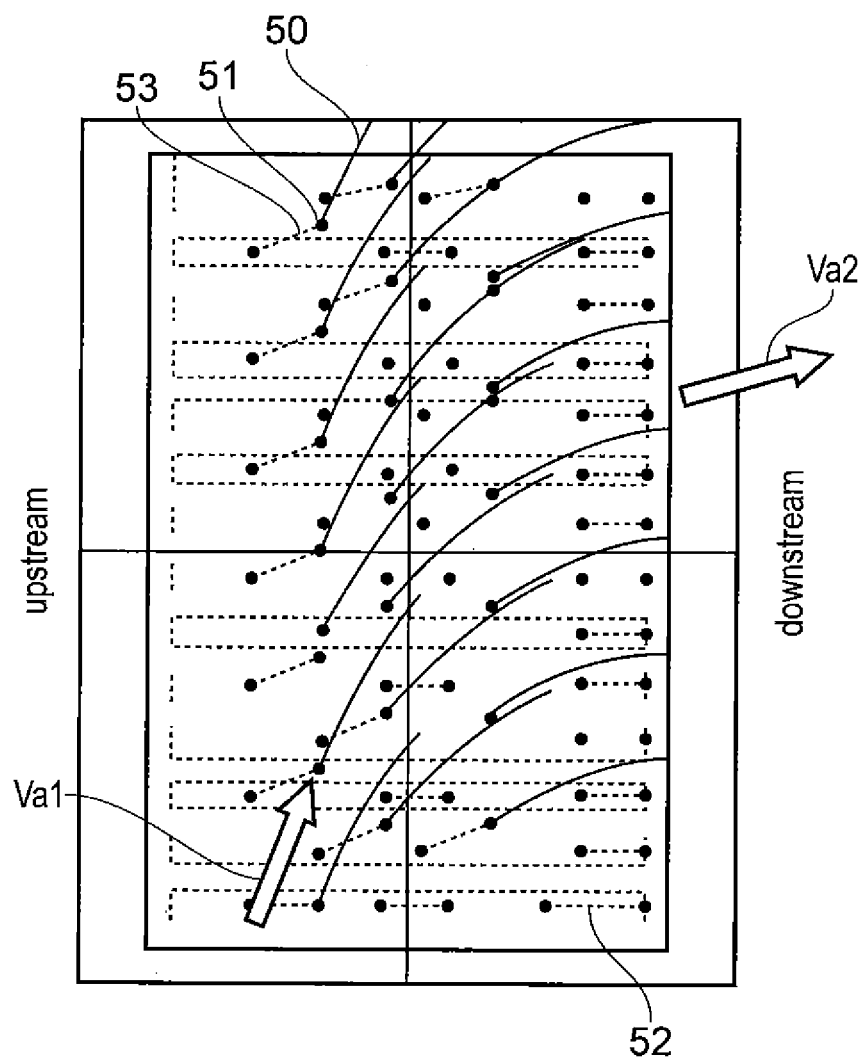
FIG. 4 shows aerodynamic streaklines determined for the gas-washed surface of a conventional shroud segment in the absolute frame of reference and for the mainstream flow between passing blades.

FIG. 4 shows aerodynamic streaklines 50 determined for the gas-washed surface of a conventional shroud segment in the absolute (i.e. non-rotating) frame of reference and for the mainstream flow between passing blades. The streaklines originate from cooling holes 51 formed in the gas-washed surface. The block arrows Va1, Va2 indicate the direction of the mainstream flow (ignoring radial components of flow) in the inter-blade passage at respectively the entrance and the exit of the passage. The cooling holes have passages (indicated by broken lines) which feed air to the holes and are either unswirled relative axial direction of the engine (passages 52) or are at a swirl angle to that direction (passages 53). The delivered air forms a cooling film over the gas-washed surface.

Unfortunately, when introducing films on to the gas washed surfaces of shroud segments, the effectiveness of the films is dependant on the strength of the secondary flows, driven substantially by the upstream NGV aerofoil and endwall geometry. Another important factor is the presence of the rotor blade tips which continuously wipe away newly formed films, preventing the establishment of traditional film trails that progressively diminish with distance from the hole. Thus, if it is possible for the gas temperature to be accommodated with less effective film coverage (e.g. by relying more heavily on convective heat picked up by the cooling air in the feed passages) then film performance can be traded for reduced blade over-tip leakage. This in turn can lead to a stage efficiency improvement resulting from reduced over-tip losses and reduced blade tip cooling requirements.

The present invention therefore proposes a change to the shroud segment film cooling configuration to reduce the quantity of leakage flow migrating over the tip of the blade. This can be achieved by configuring the feed passages to the film cooling holes in such a way that the resulting film acts as a "fluid fence" that opposes the progress of the working gas as it tries to leak over the blade tip from the pressure to the suction surface of the blade.

In order to position the cooling holes and configure the feed passages in such a manner that the trajectory of the stream of cooling air is optimised from an over-tip leakage spoiling viewpoint, it is helpful to know the streamlines of the secondary flows at the tip of the blade in both the stationary and rotating frame of reference. The cooling holes can then be located in circumferentially extending rows, with the delivered-air swirl direction from each row directly opposing the direction of the local migrating over-tip leakage flow.

Figure 5:
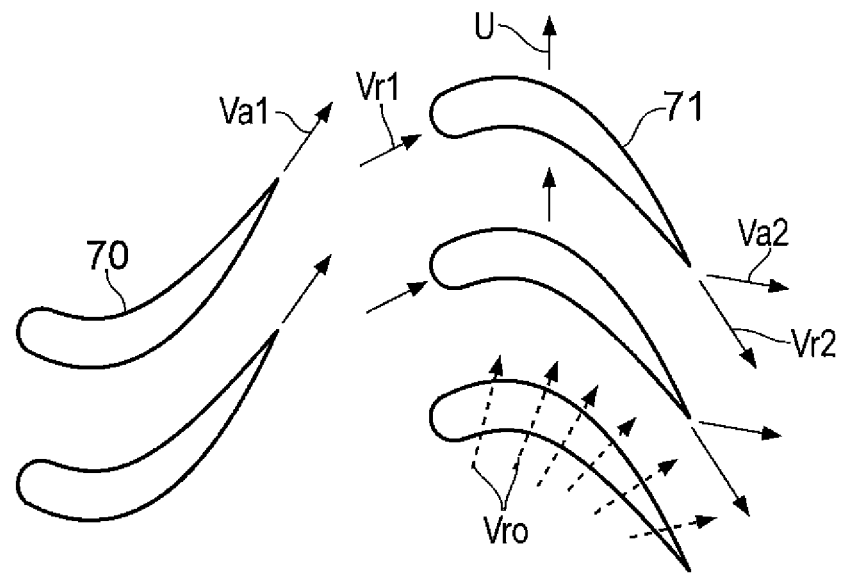
FIG. 5 shows a schematic view of a row of nozzle guide vanes and a following row of rotor blades.
Figure 6:
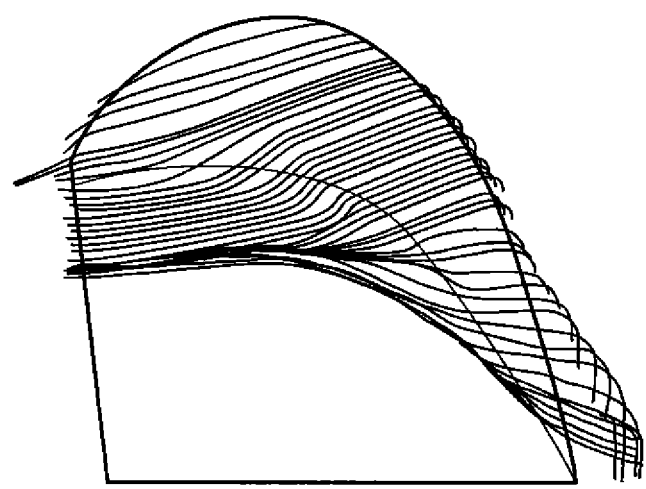
FIG. 6 shows over-tip leakage flow streamlines in the rotating frame of reference from a CFD simulation for a blade.

FIG. 5 shows a schematic view of a row of nozzle guide vanes 70 and a following row of rotor blades 71 with arrows indicating: (i) the direction of rotation U of the rotor blades, (ii) the directions of the mainstream flow Va1, Va2 in the absolute frame of reference at respectively the entrance and the exit of the row of rotor blades, and (iii) the corresponding directions Vr1, Vr2 of the mainstream flow in the rotating frame of reference. The directions of over-tip leakage flow Vro in the rotating frame of reference are indicated schematically by the dashed arrows. For comparison, FIG. 6 shows actual over-tip leakage flow streamlines in the rotating frame of reference from a CFD simulation for a blade.

Figure 7:
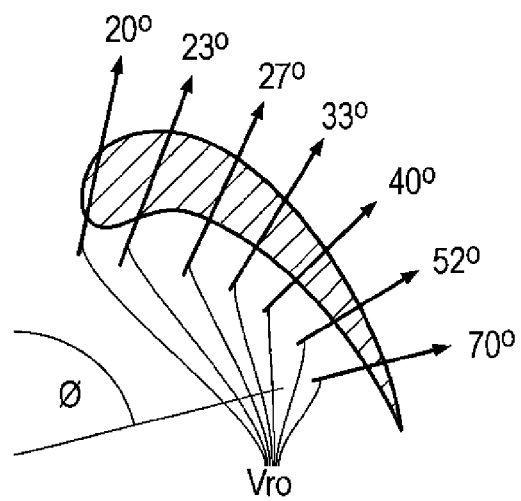
FIG. 7 shows a schematic of a rotor blade showing typical gas leakage flow angles in the relative frame of reference.

FIG. 7 shows over-tip leakage flow angles for a typical blade. It will be appreciated that the over-tip leakage flow angles shown in FIG. 7 are merely representative of typical flow angles. In the example shown in FIG. 7, the various over-tip leakage angles (ø) are shown relative to the direction of travel of the blade (i.e. relative to the local circumferential direction of the shroud). As shown in FIG. 7, the relative flow direction (Vro) becomes more axial as one moves from the leading edge to the trailing edge of the blade, i.e. the over-tip leakage angle (ø) increases from the leading edge to the trailing edge.

In the example of FIG. 7, the over-tip leakage angle (ø) increases from 20 degrees at the leading edge to 70 degrees at the trailing edge. It will be appreciated that other over-tip leakage flow angles may also be observed, depending on, for example, blade design, design of other engine components, tip clearance, and flow conditions. For example, the over-tip leakage angle (ø) may be less than 20 degrees at the leading edge, and may be greater than 70 degrees at the trailing edge.

In the example of FIG. 7, the rate at which the over-tip leakage angle (ø) increases from the leading edge to the trailing edge also increases as the distance from the leading edge increases. As such, for a given distance along the chord of the blade tip, the increase in over-tip leakage angle (ø) is greater towards the trailing edge of the blade than towards the leading edge of the blade.

Figure 8:
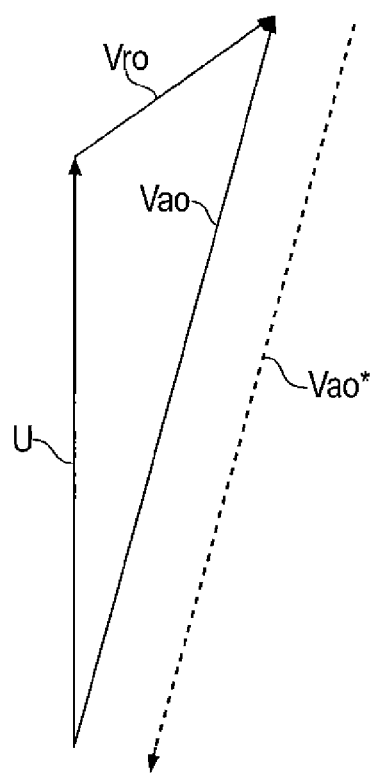
FIG. 8 shows a velocity triangle.

For each Vro, a velocity triangle can be constructed, as shown in FIG. 8, Vao representing the resultant over-tip leakage flow vector in the absolute frame. An equal and opposite vector Vao* represents the magnitude and direction of the local cooling flow that would be needed to prevent the over-tip leakage flow in the stationary frame of reference. The shape of the velocity triangle and hence the direction and magnitude of Vao* changes from the front to the rear of the segment as the direction and magnitude of Vro changes from front to rear. In general, Vao* is closer to the axial direction of the engine at the trailing edge of the blade than at the leading edge of the blade.

Figure 9:
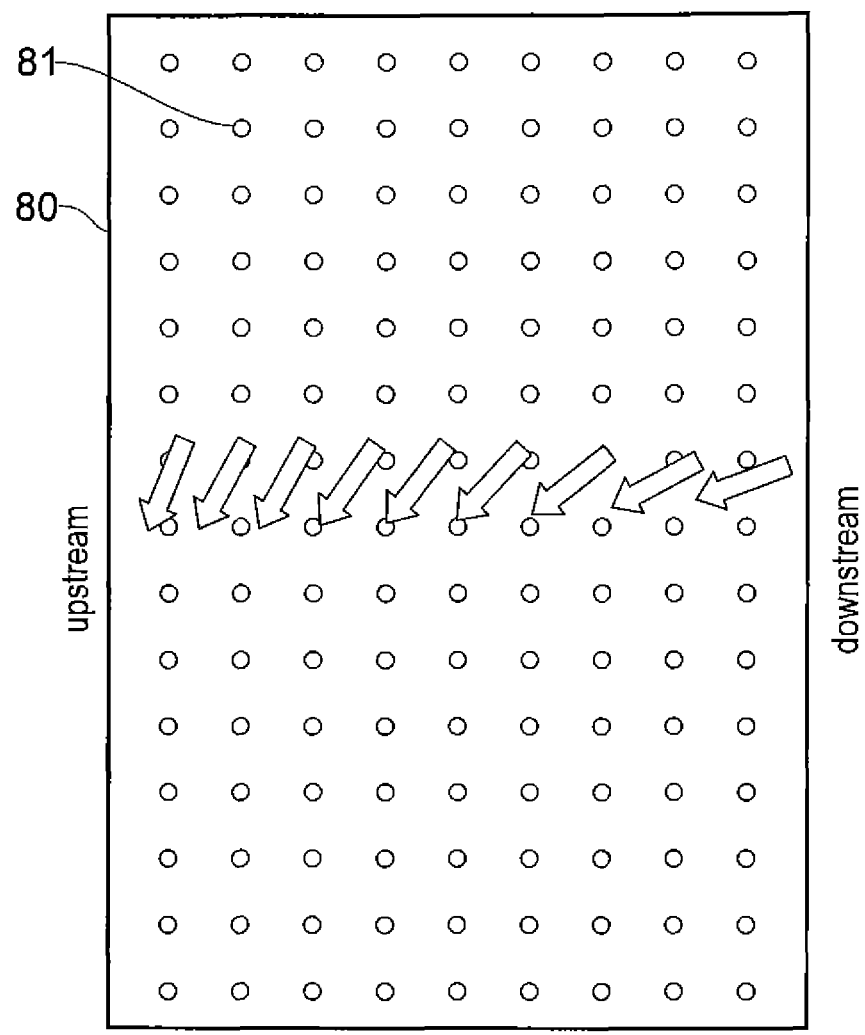
FIG. 9 shows schematically the gas-washed surface of a shroud segment having cooling holes with feed passage whose swirl angles are aligned with the swirl direction of the local over-tip leakage flow.

FIG. 9 shows schematically the gas-washed surface 80 of a shroud segment. Nine circumferentially extending rows of cooling holes 81 are distributed over that part of the surface which is swept by passing blade tips. Respective feed passages feed cooling air to the holes and are configured such that the cooling air delivered out of the holes opposes the direction of the local migrating over-tip leakage flow. The swirl directions (indicated by block arrows) of the holes of the different rows are directed along the local Vao*.

Thus the delivered air swirl angle varies from row to row as Vao* correspondingly varies in the axial direction. If necessary, e.g. to simplify manufacturing, adjacent rows of holes can share the same delivered air swirl angle, although this tends to reduce the ability of at least some of the rows to oppose the leakage flow, i.e. because at least some rows will then provide delivered-air swirl directions which are not so well aligned with the local Vao*.

If the trajectory of the delivered coolant flow is not aligned with and in a contrary direction to the blade over-tip leakage flow, then only a component of its velocity will oppose the migrating flow. Thus any such misalignment is preferably less than about 30°, more preferably less than 20°, more preferably less than 10°, more preferably between 5° and 0°.

Figure 10:
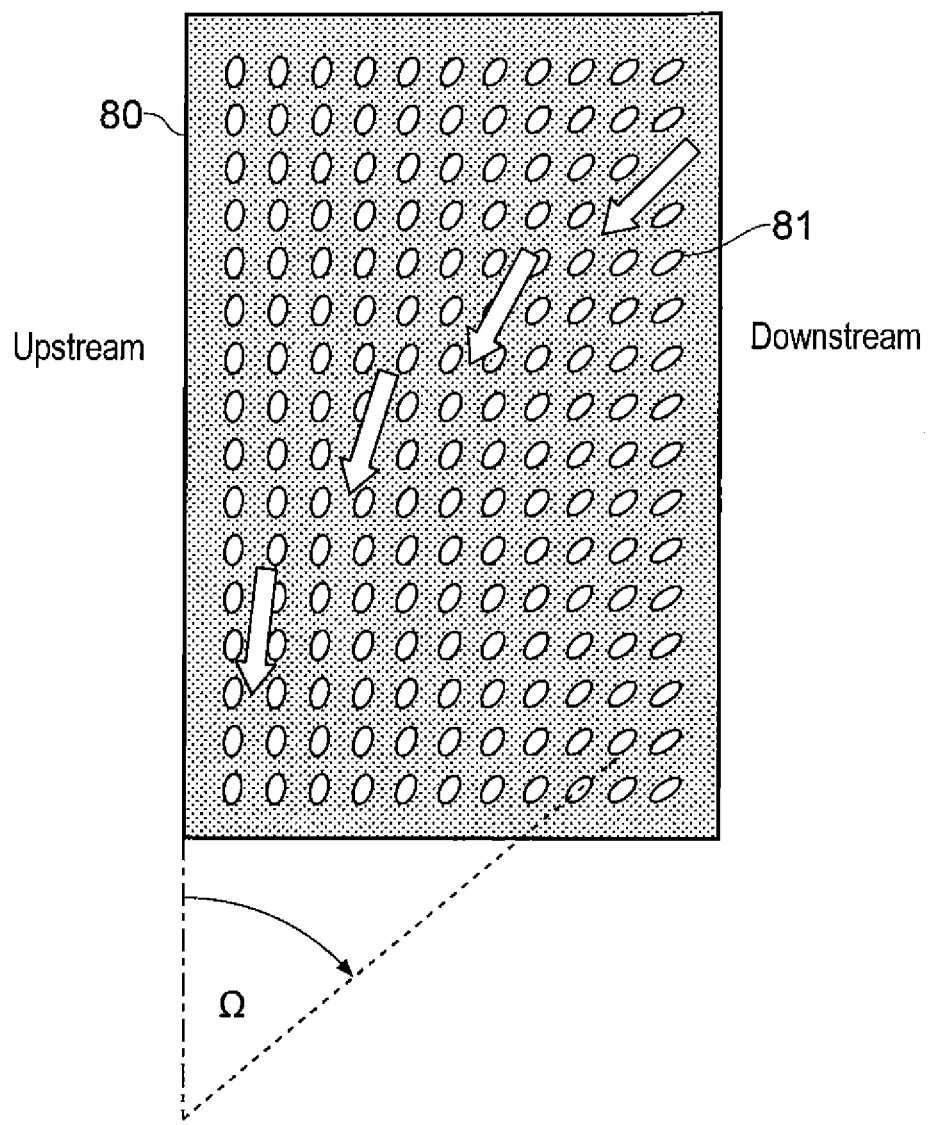
FIG. 10 also shows schematically the gas-washed surface of a shroud segment having cooling holes with feed passage whose swirl angles are aligned with the swirl direction of the local over-tip leakage flow.

FIG. 10 shows schematically the gas-washed surface 80 of a shroud segment similar to that of FIG. 9. In FIG. 10, the holes 81 become increasingly ovoid as they are angled towards the axial direction to oppose the over-tip leakage flow. The angle Ω shown in FIG. 10 represents the angle of the air delivered through the cooling holes 81 (i.e. in the direction Vao*) relative to the direction of travel of the blade (i.e. relative to the local circumferential direction of the shroud).

In the example shown in FIG. 10, the angle of the delivered air becomes more axial in the downstream direction (i.e. towards the region that is swept by the trailing edges of the blades), and thus the angle Ω increases in this direction. Typically, the angle Ω is in the range of from 0 degrees to 30 degrees, for example 2 degrees to 15 degrees, for example 5 degrees, at the upstream end of the shroud (i.e. the end of the shroud that is in the proximity of the area washed by the leading edge of the blade). Typically, the angle 1) is in the range of from 15 degrees to 60 degrees, for example 25 degrees to 45 degrees, for example 35 degrees, at the downstream end of the shroud (i.e. the end of the shroud that is in the proximity of the area washed by the trailing edge of the blade). However, in other embodiments, the delivered-air angles may be outside these ranges.

As noted above, in the described embodiments, the angle Ω increases in the downstream direction. In some embodiments, the rate at which the angle Ω increases also increases in the downstream direction.

Figure 11:
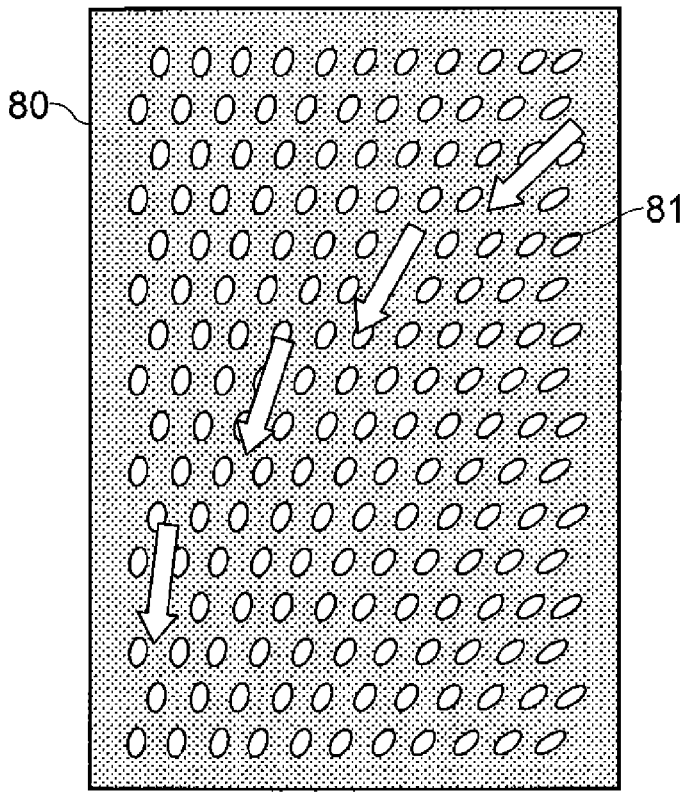
FIG. 11 shows schematically the gas-washed surface of a shroud segment similar to that of FIG. 10, but with a staggered hole arrangement.

In the embodiments shown in FIGS. 9 and 10, the holes 81 are arranged in circumferential rows. However, in alternative embodiments, the holes may be staggered. This means that circumferentially neighbouring holes may be axially offset. An example of such an arrangement is shown in FIG. 11. Such an arrangement may provide a better sealing flow around the circumference of the shroud. It may also enable the holes to have the desired angle and spacing, for example by ensuring that neighbouring holes do not interact (i.e. merge into each other).

Figure 12:
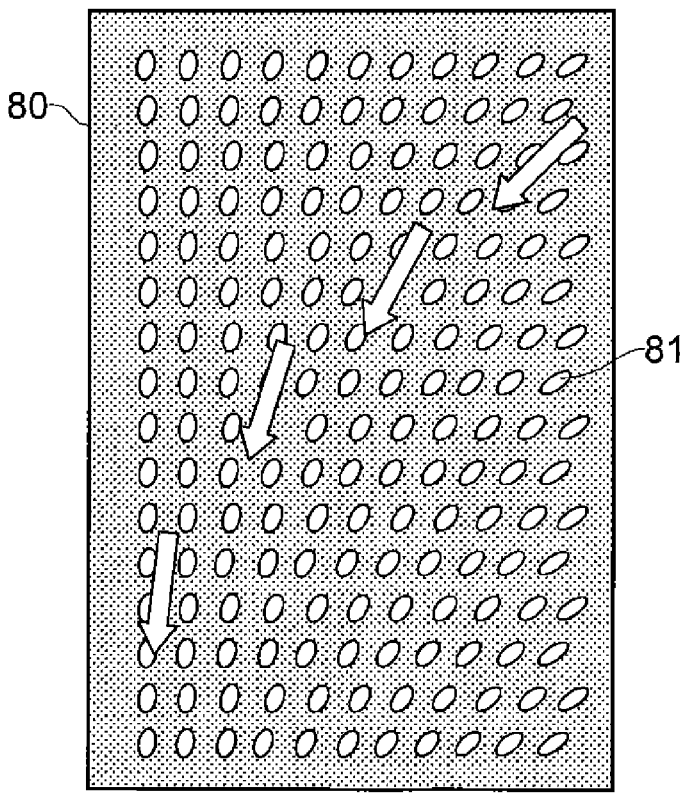
FIG. 12 shows schematically the gas-washed surface of a shroud segment similar to that of FIGS. 11 and 12, but with the hole arrangement changing progressively from in-line to staggered.

An alternative embodiment is shown in FIG. 12. In this embodiment, the holes at the upstream end are substantially in-line, i.e. they form circumferential rows, and the holes become increasingly staggered in the downstream direction.

It will be appreciated that any suitable arrangement of holes could be used. It will also be appreciated that the features of the holes 81 discussed herein in relation to FIGS. 10, 11 and 12 may apply to all embodiments, such as that shown in FIG. 9.

The holes and feed passages can be sized and/or the hole density varied such that higher delivered-air flow rates are produced at axial positions which have higher leakage flow rates. In this way, the local momentum of the delivered-air flow can be changed. The velocity, and hence momentum of the flow can also be modified by increasing the feed pressure. As increasing the coolant flow rate can be detrimental to turbine efficiency, it is advantageous to only increase delivered-air flow rates where they are needed.

A circumferentially fluctuating or "pulsing" flow regime can be produced by varying the hole and feed passage size and/or the hole density along the circumferential direction. For example, this could be achieved by changing the hole diameter in alternate holes, or in alternate blocks of 2, 3 or 4 holes, along each circumferential row. The pulsing flow to which the blade tips would then be exposed can enhance the opposition to the over-tip leakage of working gas.

Although the film cooling effectiveness is somewhat compromised transiently between passing blade tips by aligning delivered air swirl directions along the direction of the local Vao*, the adverse pressure gradient generated by the secondary flow from upstream NGVs and endwall geometries can anyway be a destructive influence on a cooling film, causing it to become detached from the gas washed surface. Thus it has been found that it is possible to use spent cooling air to reduce the quantity of hot gas leaking over the blade tips, without compromising the thermal integrity of the shroud segment. Reducing the over-tip leakage flow locally reduces the mixed out temperature of the fluid migrating over the blade tip, which has a beneficial effect both thermally and aerodynamically. In addition, the blade tip can require less coolant to maintain its integrity. If necessary, shroud segment cooling can be enhanced by improving convective heat transfer to the cooling air, e.g. by increasing the lengths of the feed passages and/or by directing them at shallower angles to the gas-washed surface (i.e. reducing the radial components of the lines of the passages).

In summary, high-pressure turbine shroud segments are increasingly dependent on high levels of conventional (typically convective) and film cooling in order to maintain acceptable component metal and coating temperatures. However, the strong secondary flow field set up particularly by upstream NGV aerofoils, combined with the passing rotor blade tips, has a destructive effect on film cooling effectiveness. Sacrificing already poor film cooling effectiveness in order to reduce rotor blade over-tip leakage and associated mixing losses (particularly in the vicinity of the late suction surface, where mixing losses tend to be most detrimental) can provide operational benefits such as improved stage efficiency and ultimately specific fuel consumption.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. A shroud segment for a turbine stage of a gas turbine engine, the segment forming an endwall for the working gas annulus of the stage, and providing a close clearance to the tips of a row of turbine blades which sweep across the segment, in use a leakage flow of the working gas passing through the clearance gap between the blade tips and the segment, wherein:
   the segment has a plurality of cooling holes and respective air feed passages for the cooling holes, the cooling holes being distributed over that part of the gas-washed surface of the segment which is swept by the blade tips, the cooling holes delivering, in use, cooling air which spreads over the gas-washed surface, and the feed passages being configured such that the delivered air opposes the leakage flow of the working gas; and
   the feed passages are configured such that the delivered-air swirl directions of those cooling holes swept by the trailing edges of the blade tips are rotated towards the axial direction of the engine relative to the delivered-air swirl directions of those cooling holes swept by the leading edges of the blade tips.

2. A shroud segment according to claim 1, wherein each feed passage is configured such that the delivered air has a swirl direction which opposes the local direction of the leakage flow at the hole to within at least 30°.

3. A shroud segment according to claim 1, wherein the feed passages are configured such that the delivered-air swirl directions of the respective cooling holes encountered when moving in an axial direction of the engine from the cooling holes swept by the leading edges of the blade tips to the cooling holes swept by the trailing edges of the blade tips rotate through an angle in the range of from 10° to 70°.

4. A shroud segment according to claim 1, wherein the portion of the gas-washed surface which is swept by the blade tips has at least four axially-spaced and circumferentially-extending rows of cooling holes, each row having a respective delivered-air swirl angle.

5. A shroud segment according to claim 4, wherein the holes of at least some neighbouring circumferentially-extending rows are circumferentially offset.

6. A shroud segment according to claim 1, wherein the delivered air from the cooling holes reduces the working gas leakage flow by at least 20% relative to the working gas leakage flow that would exist in the absence of film cooling of the segment.

7. A gas turbine engine having a turbine stage with shroud segments according to claim 1.

8. A method of producing a shroud segment for a turbine stage of a gas turbine engine, the segment forming an endwall for the working gas annulus of the stage, and providing a close clearance to the tips of a row of turbine blades which sweep across the segment, in use a leakage flow of the working gas passing through the clearance gap between the blade tips and the segment, wherein the method comprises:
   performing a computational fluid dynamics calculation to predict the leakage flow; and
   producing a shroud segment according to claim 1, the feed passages being configured such that the delivered air opposes the leakage flow of the working gas, and the delivered-air swirl directions of those cooling holes swept by the trailing edges of the blade tips are rotated towards the axial direction of the engine relative to the delivered-air swirl directions of those cooling holes swept by the leading edges of the blade tips.

* * * * *